(12) United States Patent
Alsina et al.

(10) Patent No.: US 9,087,060 B2
(45) Date of Patent: Jul. 21, 2015

(54) PARTIAL SORT ON A HOST

(75) Inventors: Thomas Matthieu Alsina, Cupertino, CA (US); Henry Graham Mason, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 13/424,100

(22) Filed: Mar. 19, 2012

(65) Prior Publication Data

US 2012/0311194 A1    Dec. 6, 2012

Related U.S. Application Data

(60) Provisional application No. 61/493,382, filed on Jun. 3, 2011.

(51) Int. Cl.
*G06F 3/00*     (2006.01)
*G06F 17/30*    (2006.01)

(52) U.S. Cl.
CPC .... *G06F 17/30053* (2013.01); *G06F 17/30014* (2013.01); *G06F 17/30017* (2013.01); *G06F 17/30176* (2013.01); *G06F 17/30197* (2013.01); *G06F 17/30595* (2013.01); *G06F 17/30654* (2013.01); *G06F 17/30879* (2013.01); *G06F 17/30893* (2013.01); *G06F 17/30899* (2013.01)

(58) Field of Classification Search
CPC .......... G06F 17/3005; G06F 17/30053; G06F 17/30056; G06F 17/30058
See application file for complete search history.

(56) References Cited

U.S. PATENT DOCUMENTS

| | | | |
|---|---|---|---|
| 6,728,729 B1* | 4/2004 | Jawa et al. ............................ 1/1 |
| 7,133,924 B1* | 11/2006 | Rosenberg et al. ........... 709/231 |
| 7,299,304 B2* | 11/2007 | Saint-Hilaire et al. .......... 710/11 |
| 7,475,078 B2* | 1/2009 | Kiilerich et al. ...................... 1/1 |
| 7,647,346 B2* | 1/2010 | Silverman et al. ..... 707/999.107 |
| 7,752,186 B2* | 7/2010 | Abajian ........................ 707/705 |
| 7,765,326 B2* | 7/2010 | Robbin et al. ................. 709/248 |
| 7,881,656 B2* | 2/2011 | Khedouri et al. ............ 455/3.01 |
| 8,176,043 B2* | 5/2012 | Iwasa et al. ................... 707/723 |
| 8,495,129 B2* | 7/2013 | Wolman et al. ............... 709/201 |
| 2002/0129693 A1* | 9/2002 | Wilks .............................. 84/609 |
| 2002/0173273 A1* | 11/2002 | Spurgat et al. .................. 455/66 |
| 2002/0174269 A1* | 11/2002 | Spurgat et al. .................... 710/1 |
| 2003/0030733 A1* | 2/2003 | Seaman et al. ................ 348/239 |
| 2003/0037124 A1* | 2/2003 | Yamaura et al. .............. 709/219 |

(Continued)

FOREIGN PATENT DOCUMENTS

EP          2 096 558 A1    9/2009

OTHER PUBLICATIONS

"Design, Implementation, and Analysis of a Multimedia Indexing and Delivery Server" by Leonidas Kontothanassis, Chris Joerg, Michael J. Swain, Brian Eberman, and Robert A. Iannucci, Cambridge Research Laboratory, Technical Report Series, Aug. 1999.*

(Continued)

*Primary Examiner* — Jing-Yih Shyu
(74) *Attorney, Agent, or Firm* — Womble Carlyle Sandridge & Rice, LLP

(57) ABSTRACT

A host devices transfers client data from a client device to the host device. The host device generates sort keys for host data that includes the client data. The host device sorts the host data using the sort keys and transfers the sorted host data to the client device. The client data and host data may include music, video, or other content.

19 Claims, 9 Drawing Sheets

(56) References Cited

U.S. PATENT DOCUMENTS

| | | |
|---|---|---|
| 2003/0041328 A1* | 2/2003 | Khoo et al. ............... 725/47 |
| 2003/0079038 A1* | 4/2003 | Robbin et al. ............ 709/232 |
| 2003/0126130 A1* | 7/2003 | Martino et al. ............... 707/7 |
| 2004/0133924 A1* | 7/2004 | Wilkins et al. ............ 725/135 |
| 2005/0034164 A1* | 2/2005 | Sano et al. ............... 725/91 |
| 2006/0227632 A1* | 10/2006 | Koyama ................... 365/200 |
| 2006/0235846 A1* | 10/2006 | Murray ........................ 707/7 |
| 2007/0038610 A1* | 2/2007 | Omoigui ...................... 707/3 |
| 2007/0147826 A1 | 6/2007 | Matsuzaki et al. |
| 2008/0168185 A1* | 7/2008 | Robbin et al. ............ 709/248 |
| 2009/0059512 A1* | 3/2009 | Lydon et al. ............... 361/686 |
| 2009/0060225 A1* | 3/2009 | Lydon et al. ............... 381/105 |
| 2009/0062947 A1* | 3/2009 | Lydon et al. ................ 700/94 |
| 2009/0164701 A1* | 6/2009 | Murray et al. ............. 711/103 |
| 2009/0171891 A1 | 7/2009 | Nochimoski et al. |
| 2010/0030908 A1* | 2/2010 | Courtemanche et al. ..... 709/231 |
| 2010/0287308 A1* | 11/2010 | Robbin et al. ............ 709/248 |
| 2011/0158610 A1* | 6/2011 | Paul et al. ................... 386/297 |
| 2011/0167092 A1 | 7/2011 | Subramaniam et al. |
| 2011/0252118 A1* | 10/2011 | Pantos et al. .............. 709/219 |

OTHER PUBLICATIONS

"An iTunes for Windows control script in Perl" by Jay McGavren, Mar. 28, 2007, downloaded from http://code.google.com/p/itunes-perl/wiki/Usage.*

Satyanarayanan M: "Pervasive Computing: Vision and Challenges", IEEE Personal Communications, IEEE Communications Society, US, Aug. 1, 2001, pp. 10-17, vol. 8, No. 4.

Rajesh Balan et al: "The case for cyber foraging", Proceedings of the 10th Workshop on ACM SIGOPS European Workshop: Beyond the PC, Jan. 1, 2002, p. 87, EW10.

International Search Report Written Opinion issued in PCT/US2012/039640 on Aug. 31, 2012, 12 pages.

"International Components for Unicode", Wikipedia, http://en.wikipedia.org/wiki/International_Components_for_Unicode, 2 pgs.

* cited by examiner t0

| Name | Sort Key | Order |
|---|---|---|
| Bach | blobA | 10 |
| Brahm | blobB | 20 |
| Chopin | blobC | 30 | new string: Beethoven t1

| Name | Sort Key | Order |
|---|---|---|
| Bach | blobA | 10 |
| Brahm | blobB | 20 |
| Chopin | blobC | 30 | t2

| Name | Sort Key | Order |
|---|---|---|
| Bach | blobA | 10 |
| Beethoven | blobD | 15 |
| Brahm | blobB | 20 |
| Chopin | blobC | 30 |

PARTIAL SORT ON A HOST

RELATED APPLICATIONS

This application claims priority to co-pending U.S. Provisional Patent Application No. 61/493,382, filed on Jun. 3, 2011.

FIELD OF THE INVENTION

Embodiments of the invention are generally directed toward sorting file collections, and in particular, partially sorting a file collection on a host.

BACKGROUND

Many mobile devices available today are capable of playing music, video, and other content. This content is frequently synchronized with another data processing system, such as a desktop computer. In current embodiments, after the synchronized content is available on the mobile device, the device itself is responsible for sorting the content so it can be presented to the user. Sorting the large amounts of content that can be stored on today's mobile devices is expensive, in that the mobile device is generally locked and unusable by the user while the sorting occurs and expensive in that it consumes battery power. Generating sort keys for the content prior to performing the sort is especially expensive.

FIG. 1 is a diagram illustrating a prior art system. At time t0, a device begins syncing with a host. At time t1, the sync is complete and the device has the synchronized content. The device then begins the process of sorting the synchronized data collection, which is complete at time t2. From t0 to t2, the content is unavailable to the user, either because it is being synchronized (t0 to t1) or being sorted by the device (t1 to t2). As noted above, this has a negative impact on the user experience, since the device is inaccessible to the user, and is expensive, because the sorting process consumes battery and generates heat.

SUMMARY

A host device transfers client data from a client device to the host device. The host device generates sort keys for host data that includes the client data. The host device sorts the host data using the sort keys and transfers the sorted host data to the client device. The client data and host data may include music, video, or other content. In one embodiment, the roles, in a method performed as described herein, of the client and host can be interchangeable.

DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Mobile devices (e.g., iPhone, etc.) are generally synchronized with at least one other data processing system such as a desktop computer. Content (e.g., music, video, etc.) is synchronized between the mobile device and the other system. In order to present this content to a user of the mobile device in a structured fashion, the content needs to be sorted. This operation can be expensive in terms of processor and battery consumption, and generally requires that the mobile device be put in a state in which the mobile device (or the content) is unavailable to a user.

In one embodiment of the invention, a partial or complete sort of the synchronized content is performed on the host system and is transferred to the mobile device as part of the synchronization operation. In many cases, the host system is a desktop computer, which tend to be significantly more powerful than mobile devices and generally are not powered by an exhaustible (e.g., battery) power source. These characteristics make the host system more suitable to perform an expensive operation, such as a content sort. In one embodiment, the most expensive part of a content sort is generating sorts keys prior to performing the sort itself. In this embodiment, the sort may be performed by the host or the device, while the host generates the sort keys.

Figure 1:
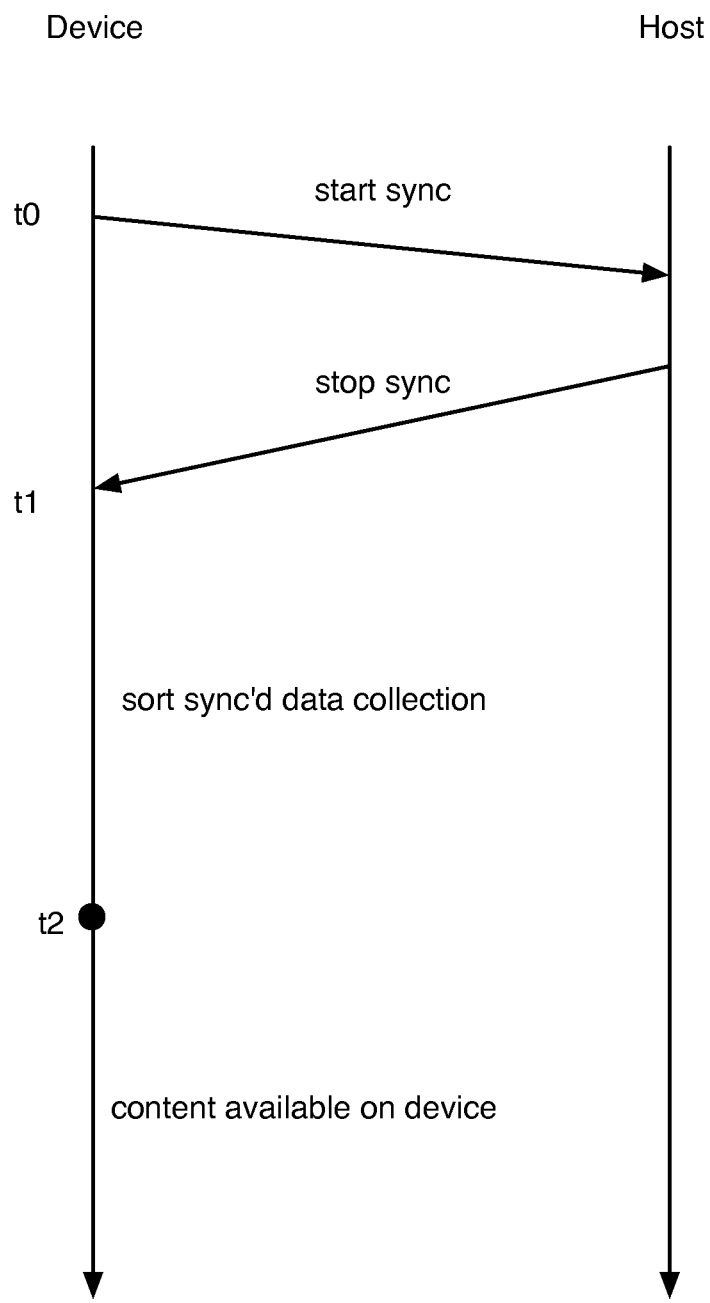
FIG. 1 is a timing diagram illustrating a prior art system involving a device and a host.
Figure 2:
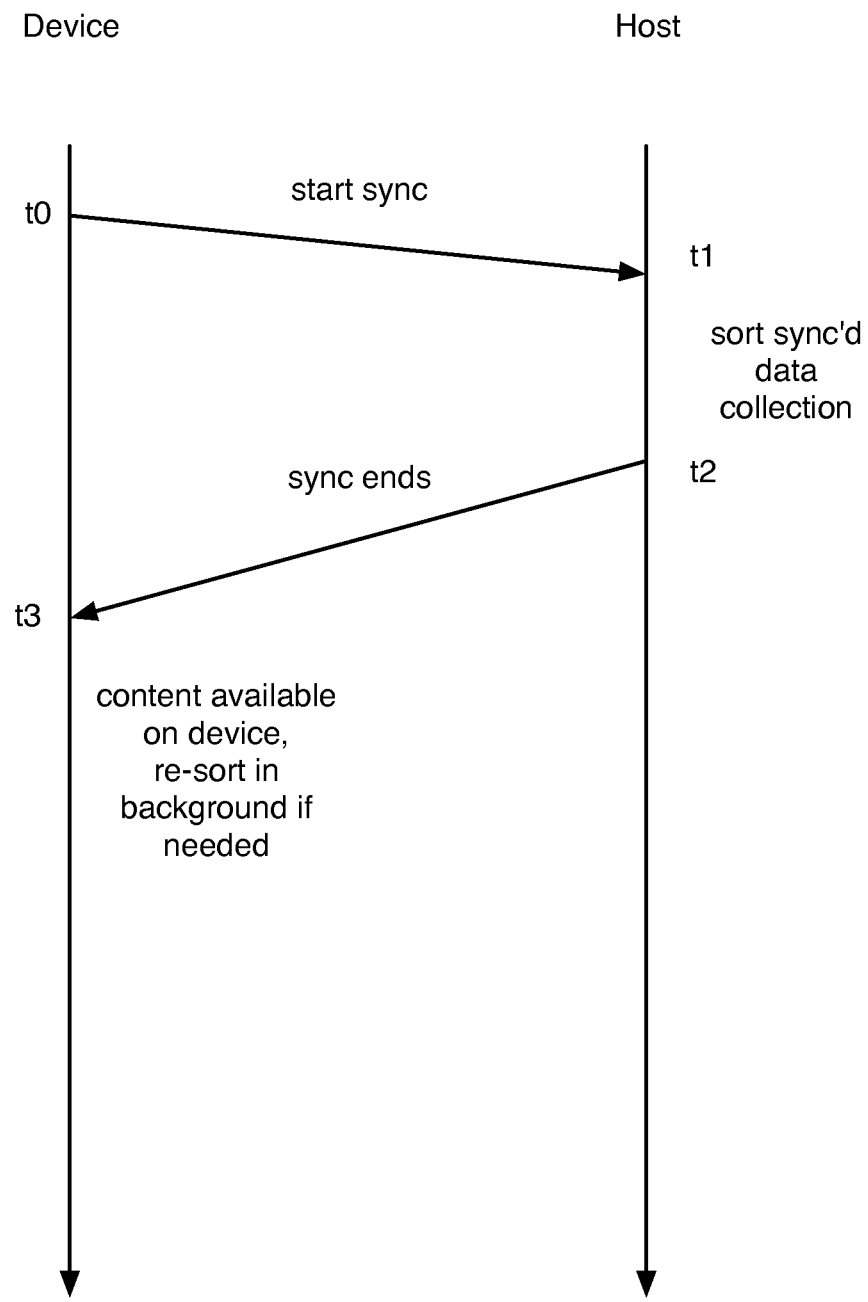
FIG. 2 is a timing diagram illustrating an embodiment of the invention.

FIG. 2 is a timing diagram that illustrates performing a partial sort on a host according to an embodiment of the invention. At time t0, the device begins a sync operation with the host. As part of the sync operation executing from time a t1 to time t2, the host sorts the synchronized data collection and creates sort keys for the data collection. Sorting and sort keys are described in greater detail below in conjunction with FIGS. 3A, 3B, and 4.

At time t2, the sync operation ends and the host sends the sorted data collection and the sort keys back to the device. At time t3, the device receives some or all of the sorted data collection. At this point, the device can be used by a user. In addition, the content in the data collection (e.g., songs) is available in a sorted fashion to the user (e.g., list by artist, song, etc.).

In one embodiment, the data collection or sort keys may require some modification by the device. For example, the device may use a different locale or language than the host. However, since the content is already sorted, the modifications can be performed in the background on the device, or even delayed until a more opportune time (e.g., the device is plugged in to A/C power; the device is locked and/or not being used).

Figure 3A:
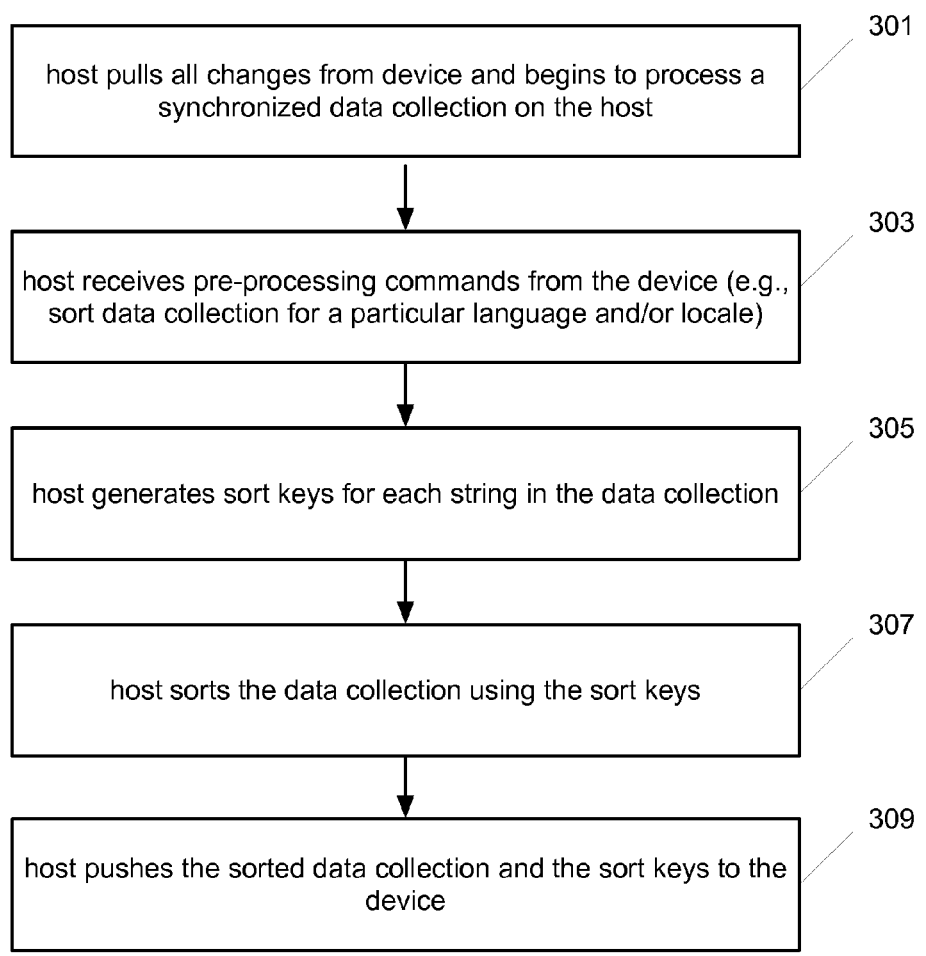
FIG. 3A is a flow chart illustrating a method of performing a partial sort on a host according to an embodiment of the invention.

In one embodiment, performing a partial sort by the host is coordinated by two methods: one on the host and one on the device. FIG. 3A is a flow chart illustrating a host-side method of performing a partial sort according to an embodiment of the invention. The method illustrated in FIG. 3A may be performed by a data processing system such as the one illustrated in FIG. 6.

At block 301, the host-side method causes the host to pull changes from the device and to begin processing a synchronized data collection on the host. In other words, the host examines the changes from the device's data collection and the changes in the host's data collection and merges them into a synchronized data collection and resolves conflicts between the two data collections as is known in the art.

At block 303, the host-side method receives pre-processing commands from the device. For example, the device may request that the host perform a sort of the data collection according to a particular language or locale.

At block 305, the host-side method generates sort keys, which may be unique binary blobs assigned to each string present in the data collection. Strings may include artist name, song name, album name, etc. In one embodiment, the International Components for Unicode (ICU) system may be used to generate localized sort keys.

At block 307, the host-side method sorts the data collection using the sort keys as is known in the art. In one embodiment, the host-side method may also assign integer values to the sorted data collection to simplify importing new content (e.g., songs) into the data collection. Assigning integer values is described below in conjunction with FIG. 4.

At block 309, the host-side method pushes the sorted data collection and the sort keys to the device. In one embodiment, this occurs at the end of a synchronization session between the host and the device.

Figure 3B:
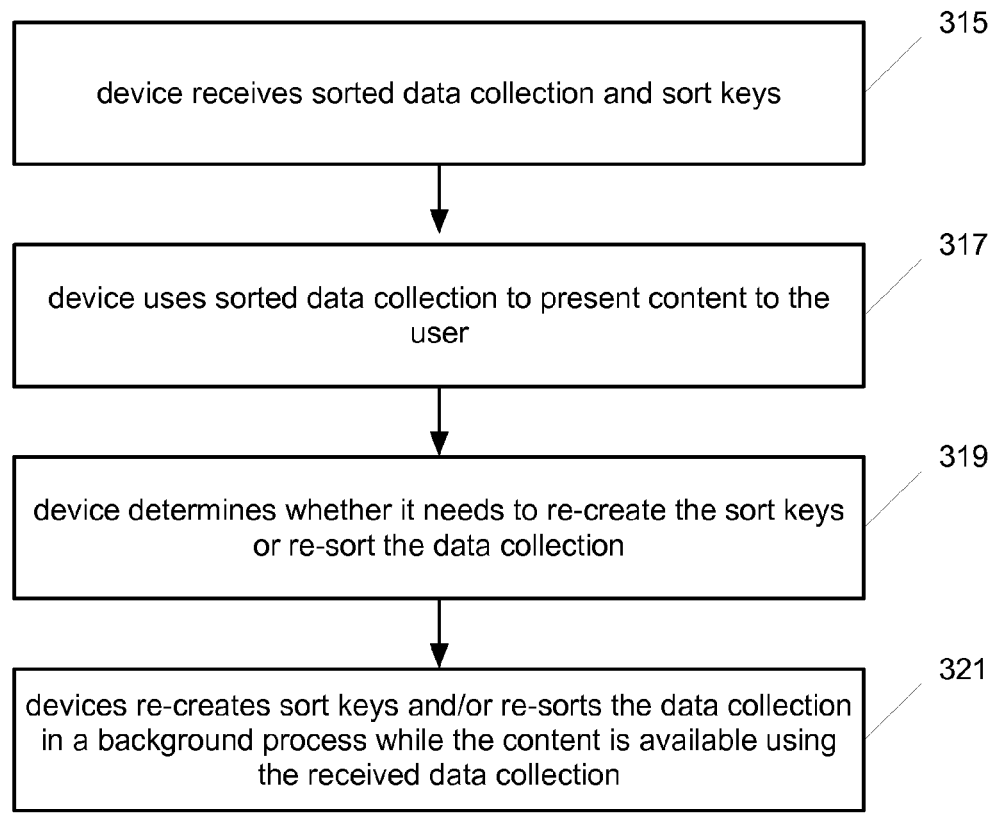
FIG. 3B is a flow chart illustrating a method of performing a background sort on a device according to an embodiment of the invention.

Turning now to FIG. 3B, in which a flow chart illustrates a device-side method for performing a partial sort on a host. The method illustrated in FIG. 3B may be performed by a device such as the device illustrated in FIG. 7.

At block 315, the device-side method receives a sorted data collection and a set of sort keys. These inputs may be received from the host-side method illustrated in FIG. 3A.

At block 317, the device-side method uses the sorted data collection to present content to the user. For example, the user of a mobile device may request a sorted list of songs stored on the device. The list would be sorted according to the sorted data collection received at block 315. In this embodiment, the device becomes useable by the user after the synchronization session is complete. That is, rather than locking the device until the device can sort the synchronized data collection, the device is immediately usable by virtue of the sorted data collection. The user may play back content selected from the sorted data collection. In one embodiment, the device becomes usable before each item in the data collection has been received. In this embodiment, the user is notified if a selected item has not been fully downloaded. The item may be prioritized for earlier download in response to the user selection.

At block 319, the device-side method determines whether the device needs to re-create the sort keys received from the host or re-sort the data collection. In one embodiment, the device uses a language or locale unavailable to the host. For example, the device may use a first version of the International Components for Unicode and the host may use a different version. This may result in sort keys received from the host that differ from the sort keys that would be generated by the device for the same string. However, the overall order of the strings may change rarely.

At block 321, the device-side method re-creates sort keys and/or re-sorts the data collection. In one embodiment, these tasks are performed in a background process while the content is available to the user using the sorted data collection received at block 315. These tasks may also be delayed until the user is not using the device in order to reduce competition for processor and memory resources. The tasks may also be delayed until the device is connected to a non-battery power source to reduce battery drain.

In one embodiment, the sorted data collection is enhanced by adding an order number which is easier to sort and maintain than the sort keys, which can be quite large. In this embodiment, the host generates sort keys for the synchronized data collection sorts the data collection using the sort keys. The host then adds order numbers to each entry in the data collection. These order numbers are generated such that there are some number of integers available between each order number to facilitate subsequent importing of strings into the data collection. Order numbers and importation of strings is described in greater detail below in conjunction with FIGS. 4A and 4B.

Figure 4B:
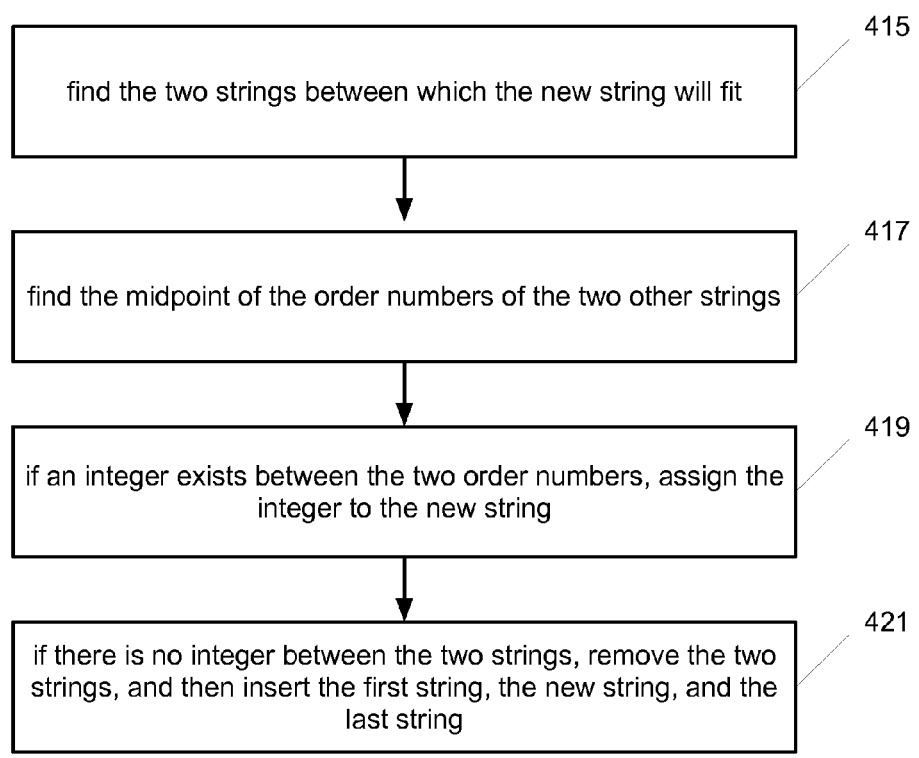
FIG. 4 is a diagram illustrating a sort table according to an embodiment of the invention.

FIG. 4A illustrates a portion of a data collection at three time intervals. At time t0, the portion includes Bach, Brahm, and Chopin. Order numbers are assigned to the sorted collection in intervals of ten. At time t1, a new string "Beethoven" is to be added to the portion of the data collection. One example of a method for importing a string is described in FIG. 4B. At time t2, the new string has been added in the appropriate location.

Figure 7:
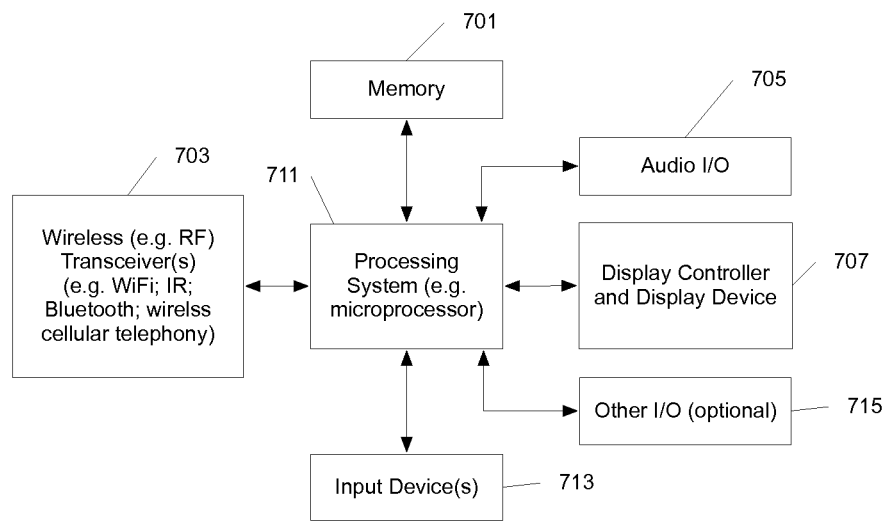
FIG. 7 is a diagram illustrating a device that may be used with an embodiment of the invention.

FIG. 4B is a flow chart illustrating a method of importing a string into a data collection using order numbers described above and may be performed by the device illustrated in FIG. 7. At block 415, the method finds the two strings between which the new string will fit. In FIG. 4A, this would be between "Bach" and "Brahm."

At block 417, the method finds the midpoint of the order numbers of the two other strings, which in the case of FIG. 4A would be 15.

At block 419, the method determines if an integer exists between the two order numbers, and assigns the integer to the new string and may generate a sort key for the string. In FIG. 4A, an integer does exist (15) and is assigned to the new string.

At block 421, if the method determines that there is no integer between the two strings, both strings are removed and all three strings are re-inserted into the data collection. In one embodiment, the re-insert is performed recursively as is known in the art.

Figure 5:
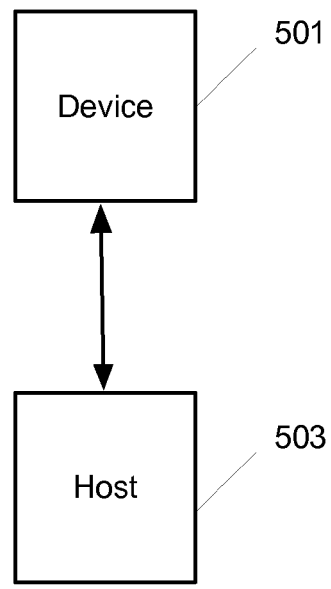
FIG. 5 is a system diagram illustrating an embodiment of the invention.

FIG. 5 is a system diagram illustrating an embodiment of the invention. Device 501 is coupled to host 503 through some coupling means. For example, device 501 may communicate with host 503 through a wired means, such as a USB cable. As another example, device 501 may communicate with host 503 through wireless means, such as an implementation of IEEE 802.11. Device 501 may take the form of a mobile device, such as a smart phone (e.g., Apple iPhone), a tablet computer (e.g., Apple iPad), or another data processing system.

Figure 6:
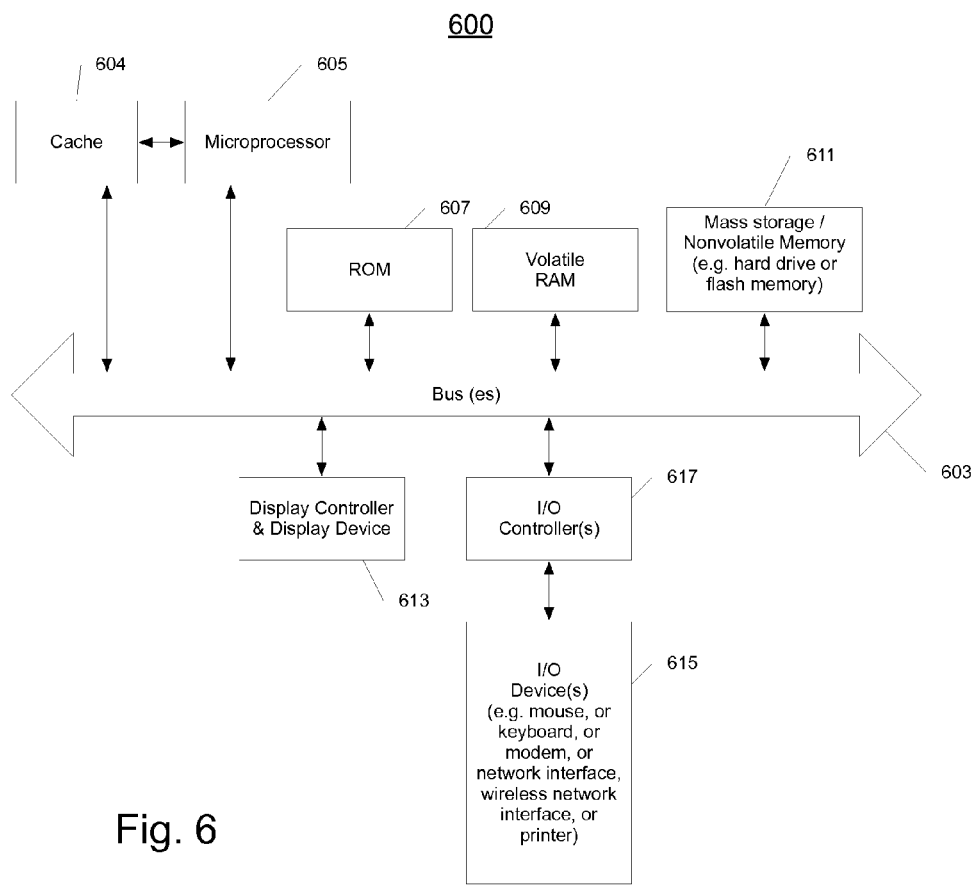
FIG. 6 is a diagram illustrating a data processing system that may be used with an embodiment of the invention.

FIG. 6 shows one example of a data processing system, which may be used with one embodiment of the present invention. Note that while FIG. 6 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 is coupled to cache 604. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, touch screens, touch pads, touch sensitive input devices, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

The mass storage 611 is typically a magnetic hard drive or a magnetic optical drive or an optical drive or a DVD RAM or a flash memory or other types of memory systems which maintain data (e.g., large amounts of data) even after power is removed from the system. Typically, the mass storage 611 will also be a random access memory although this is not required. Mass storage 611 may also take the form of flash memory or other solid-state storage. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

FIG. 7 shows an example of another data processing system which may be used with one embodiment of the present invention. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705 which may include a microphone and a speaker for, for example, playing back music or providing telephone functionality through the speaker and microphone.

A display controller and display device 707 provide a visual user interface for the user; this digital interface may include a graphical user interface which is similar to that shown on a Macintosh computer when running OS X operating system software. The system 700 also includes one or more wireless transceivers 703. A wireless transceiver may be a WiFi transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system.

The data processing system 700 also includes one or more input devices 713 which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 700 may be a network computer or an embedded processing device within another device, or other types of data processing systems which have fewer components or perhaps more components than that shown in FIG. 7.

In the foregoing specification, performing a partial sort of a data collection on a host has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
at a host device:
receiving client data from a client device;
synchronizing host data with the client data to yield a synchronized data collection;
receiving, from the client device, a request to sort the synchronized data collection according to a particular language or locale;
generating a set of sort keys for the synchronized data collection, wherein the set of sort keys is generated based on the particular language or locale associated with the request;
sorting the synchronized data collection using the generated set of sort keys to yield a sorted data collection;
generating an order number for each entry in the sorted data collection; and
transferring the sorted data collection and the generated set of sort keys to the client device, wherein the client device becomes useable when the client device receives at least a portion of the sorted data collection from the host device.

2. The method of claim 1, wherein the client data includes one or more changes made to the client data at the client device.

3. The method of claim 1, wherein each sort key in the set of sort keys comprises a unique binary blob assigned to a particular string present in the synchronized data collection.

4. The method of claim 1, wherein the client data is received in response to an initiation of a synchronization session, and the client device becomes usable after completion of the synchronization session.

5. A method, comprising:
at a client device:
receiving, from a host device, a sorted data collection and a set of sort keys associated with the sorted data collection, wherein the set of sort keys is generated at the host device;
presenting, to a user operating the client device, content using the sorted data collection, wherein the client device becomes useable and presents the content when at least a portion of the sorted data collection is received from the host device;
determining that the sorted data collection requires an update;

determining whether a preferred update state associated with the client device has been detected; and updating the sorted data collection when the preferred update state has been detected, wherein updating the sorted data collection comprises re-creating the set of sort keys or re-sorting the sorted data collection, and updating of the sorted data collection is performed in a background process while presenting the content using the sorted data collection.

6. The method of claim 5, wherein the preferred update state occurs when the client device is not being used by the user, and updating of the sorted data collection is initiated when the client device is not being used by the user.

7. The method of claim 5, wherein the preferred update state occurs at least when the client device is connected to A/C power, and updating of the sorted data collection is initiated when the client device is connected to A/C power.

8. The method of claim 5, wherein the client device becomes usable before each item in the sorted data collection is received.

9. The method of claim 8, wherein download of a particular item in the sorted data collection is prioritized in response to a user selection of the particular item.

10. A non-transitory machine readable medium configured to store instructions that, when executed by a processor included in a host device, cause the host device to:
receive client data from a client device;
synchronize host data with the client data to yield a synchronized data collection;
receive, from the client device, a request to sort the synchronized data collection according to a particular language or locale;
generate a set of sort keys for the synchronized data collection, wherein the set of sort keys is generated based on the particular language or locale associated with the request;
sort the synchronized data collection using the generated set of sort keys to yield a sorted data collection;
generate an order number for each entry in the sorted data collection; and
transfer the sorted data collection and the generated set of sort keys to the client device, wherein the client device becomes useable when the client device receives at least a portion of the sorted data collection from the host device.

11. The non-transitory machine readable medium of claim 10, wherein the client data includes one or more changes made to the client data at the client device.

12. A non-transitory machine readable medium configured to store instructions that, when executed by a processor included in a client device, cause the client device to:
receive, from a host device, a sorted data collection and a set of sort keys associated with the sorted data collection, wherein the set of sort keys is generated at the host device;
present, to a user operating the client device, content using the sorted data collection, wherein the client device becomes useable and presents the content when at least a portion of the sorted data collection is received from the host device;
determine that the sorted data collection requires an update;
determine whether a preferred update state associated with the client device has been detected; and
update the sorted data collection when the preferred update state has been detected, wherein the update is performed by re-creating the set of sort keys or re-sorting the sorted data collection and is performed in a background process while presenting the content using the sorted data collection.

13. The non-transitory machine readable medium of claim 12, wherein the preferred update state occurs when the client device is not being used by the user, and the update is initiated when the client device is not being used by the user.

14. The non-transitory machine readable medium of claim 12, wherein the preferred update state occurs at least when the client device is connected to A/C power, and the update is initiated when the client device is connected to A/C power.

15. A host device, comprising:
a processor configured to:
receive client data from a client device;
synchronize host data with the client data to yield a synchronized data collection;
receive, from the client device, a request to sort the synchronized data collection according to a particular language or locale;
generate a set of sort keys for the synchronized data collection, wherein the set of sort keys is generated based on the particular language or locale associated with the request;
sort the synchronized data collection using the generated set of sort keys to yield a sorted data collection;
generate an order number for each entry in the sorted data collection; and
transfer the sorted data collection and the generated set of sort keys to the client device, wherein the client device becomes useable when the client device receives at least a portion of the sorted data collection from the host device.

16. The host device of claim 15, wherein the client data includes one or more changes made to the client data at the client device.

17. A client device, comprising:
a processor configured to:
receive, from a host device, a sorted data collection and a set of sort keys associated with the sorted data collection, wherein the set of sort keys is generated at the host device;
present, to a user operating the client device, content using the sorted data collection, wherein the client device becomes useable and presents the content when at least a portion of the sorted data collection is received from the host device;
determine that the sorted data collection requires an update;
determine whether a preferred update state associated with the client device has been detected; and
update the sorted data collection when the preferred update state has been detected, wherein the update is performed by re-creating the set of sort keys or re-sorting the sorted data collection and is performed in a background process while presenting the content using the sorted data collection.

18. The client device of claim 17, wherein the preferred update state occurs when the client device is not being used by the user, and the update is initiated when the client device is not being used by the user.

19. The client device of claim 17, wherein the preferred update state occurs at least when the client device is connected to A/C power, and the update is initiated when the client device is connected to A/C power.

* * * * *